United States Patent [19]
Sienz et al.

[11] Patent Number: 5,850,112
[45] Date of Patent: Dec. 15, 1998

[54] LINEAR MOTOR

[75] Inventors: Michael Sienz, Overath; Dietmar Stoiber, Grünwald; Gerd Schwarz, München, all of Germany

[73] Assignee: Krauss-Maffei AG, München, Germany

[21] Appl. No.: 953,805

[22] Filed: Oct. 8, 1997

[51] Int. Cl.⁶ .................................................. H02K 41/00
[52] U.S. Cl. .............................................. 310/12; 310/58
[58] Field of Search ................................. 310/12, 13, 14, 310/52, 54, 57, 58, 59, 60 R, 60 A, 61, 62, 63

[56] References Cited

U.S. PATENT DOCUMENTS

| | | | |
|---|---|---|---|
| 2,606,946 | 8/1952 | Fischer | 310/54 |
| 4,839,545 | 6/1989 | Chitayat | 310/12 |
| 5,258,671 | 11/1993 | Vollenwyder | 310/12 |

FOREIGN PATENT DOCUMENTS

| | | |
|---|---|---|
| 67 169 | 6/1969 | Germany . |
| 2111881A | 9/1972 | Germany . |
| 23 20 522 | 11/1973 | Germany . |
| 295 01 109.2 | 4/1995 | Germany . |
| 63-144702 A | 10/1988 | Japan . |
| 01 283042 | 11/1989 | Japan . |
| 04 183258 A | 6/1992 | Japan . |
| WO91 05398 A | 4/1991 | WIPO . |

*Primary Examiner*—Clayton E. Laballe
*Assistant Examiner*—Judson H. Jones
*Attorney, Agent, or Firm*—Henry M. Feiereisen

[57] ABSTRACT

A linear motor includes a primary part which is cooled using a coolant circuit to remove heat loss caused in the current-carrying conductor windings so as to prevent excess operational temperatures in the linear motor. In order to allow the linear motor to be used in immediate proximity of a production machine without affecting operation thereof by interference occurring in the work zone and without affecting the work zone through heat released by the linear motor, the primary part is completely encapsulated by an enveloping casing in conjunction with a cooling plate through which coolant flows. The cooling plate represents the element by which the primary part is secured to the machine part to be moved of the production machine.

18 Claims, 2 Drawing Sheets

LINEAR MOTOR

This application is a continuation of pending international application number PCT/EP97/00039, filed Jan. 8, 1997.

BACKGROUND OF THE INVENTION

The invention generally relates to a linear motor, and more particularly to a linear motor of a type having a primary part in the form of an iron core, and a secondary part, with the primary part having one surface provided with grooves for receiving single-phase or multi-phase electrical windings and an opposite, flat surface for attachment of a cooling plate which is used for securing the primary part to a machine part being moved by the linear motor.

Because of their inherent high speed and precision, linear motors are presently used more and more frequently in modern production machines, replacing conventional rotating motors and their associated transmission mechanisms, with the primary part of the linear motor being typically coupled directly to the machine part of the production machine which is to be moved. Unlike a rotating motor which can be installed remote from the immediate work zone of the production machine because of the inherent versatility of the transmission mechanism, the linear motor is directly exposed to the environmental conditions in the work zone of the production machine, such as an extensive application of coolants and lubricants. On the other hand, the work zone of the production machine is also adversely affected by the substantial quantity of waste heat generated in the windings of the moveable primary part as a result of the ohmic resistance of the windings. In particular, production machines employed in precision machining operations cannot tolerate these additional quantities of waste heat. It is generally known to employ cooling circuits carrying a refrigerant for removing waste heat generated in the primary part. It is further known from the field of transportation engineering to protect primary parts of linear motors from the environment by providing enclosures made of stainless steel. The technical solutions provided by the conventional methods described above, however, solve only the specific problem associated with a specific application.

SUMMARY OF THE INVENTION

It is therefore an object of the present invention to provide an improved linear motor, obviating the afore-stated drawbacks.

In particular, it is an object of the present invention to provide an improved linear motor with a primary part which is so designed as to provide a universally applicable standard element that is immune to adverse effects from the work zone of production machines and, due to its thermal neutrality, provides a motor element which does not adversely affect the temperature conditions in the work zone of the production machine.

These objects, and others which will become apparent hereinafter, are attained in accordance with the present invention by providing a protective casing which in conjunction with the cooling plate completely envelopes the primary part.

Through the provision of the protective casing in conjunction with the cooling plate, the primary part of the linear motor according to the present invention is surrounded all-round so that operation of this motor part is not adversely affected by interference caused in the work zone of a production machine, and the motor part is prevented from radiating waste heat to the work zone.

Preferably, the primary part is made of an iron core which has incorporated therein a separate integrated coolant circuit to prevent the linear motor from overheating and to ensure that the linear motor is maintained at proper operational temperature. In addition, the cooling plate is provided with a separate cooling circuit on the load side to protect the machine from excess heat.

Suitably, the iron core of the primary part and the cooling plate are separated from one another by a thermal insulation to enable a more efficient and precise temperature control of both cooling circuits. In particular, it allows to keep the temperature of the cooling plates within narrow tolerance in the demanded neutral temperature level.

For increasing the electrical breakdown strength and for removing waste heat from the windings of the moveable primary part, voids formed between the cooling plate and the protective casing can be filled with a solid casting compound or with a heat transfer oil, such as transformer oil. The load-carrying capacity of the windings disposed on the moveable primary part can thereby be increased.

Preferably, the iron core of the primary part and the cooling plate are separated from each other by a thermally insulating layer, so that the temperatures of the two cooling circuits can be controlled more efficiently and more accurately. More particularly, the temperature of the cooling plates can be maintained at the required neutral temperature level within narrow limits.

According to another feature of the present invention, the cooling plate is secured separately to the iron core of the primary part. Suitably, threaded bushings can be employed to secure the enclosed primary part to the machine part which is to be moved. With these bushings which are provided with an internal thread aligned with bores disposed in the machine part, the cooling plate can be secured to the iron core, optionally at interposition of an insulating layer. Screw fasteners extending through these bores are then used to secure the encapsulated linear motor part to the machine part to be moved. This type of attachment has the advantage that the screw fasteners are not screwed directly into the iron body that is typically made of laminated electric sheets, but rather into the more durable internal thread of the threaded bushing. Consequently, even repeated disassembly of the linear motor part does not adversely affect the integrity of the thread.

According to another feature of the present invention, heat-radiating fins are secured to the side walls and/or end walls of the protective casing and connected to the cooling plate for heat removal. As a result of the thermally conducting connection between the heat-radiating fins and the cooling plate, heat absorbed by the heat-radiating fins is transferred to the cooling plate and removed by the cooling circuit of the cooling plate.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
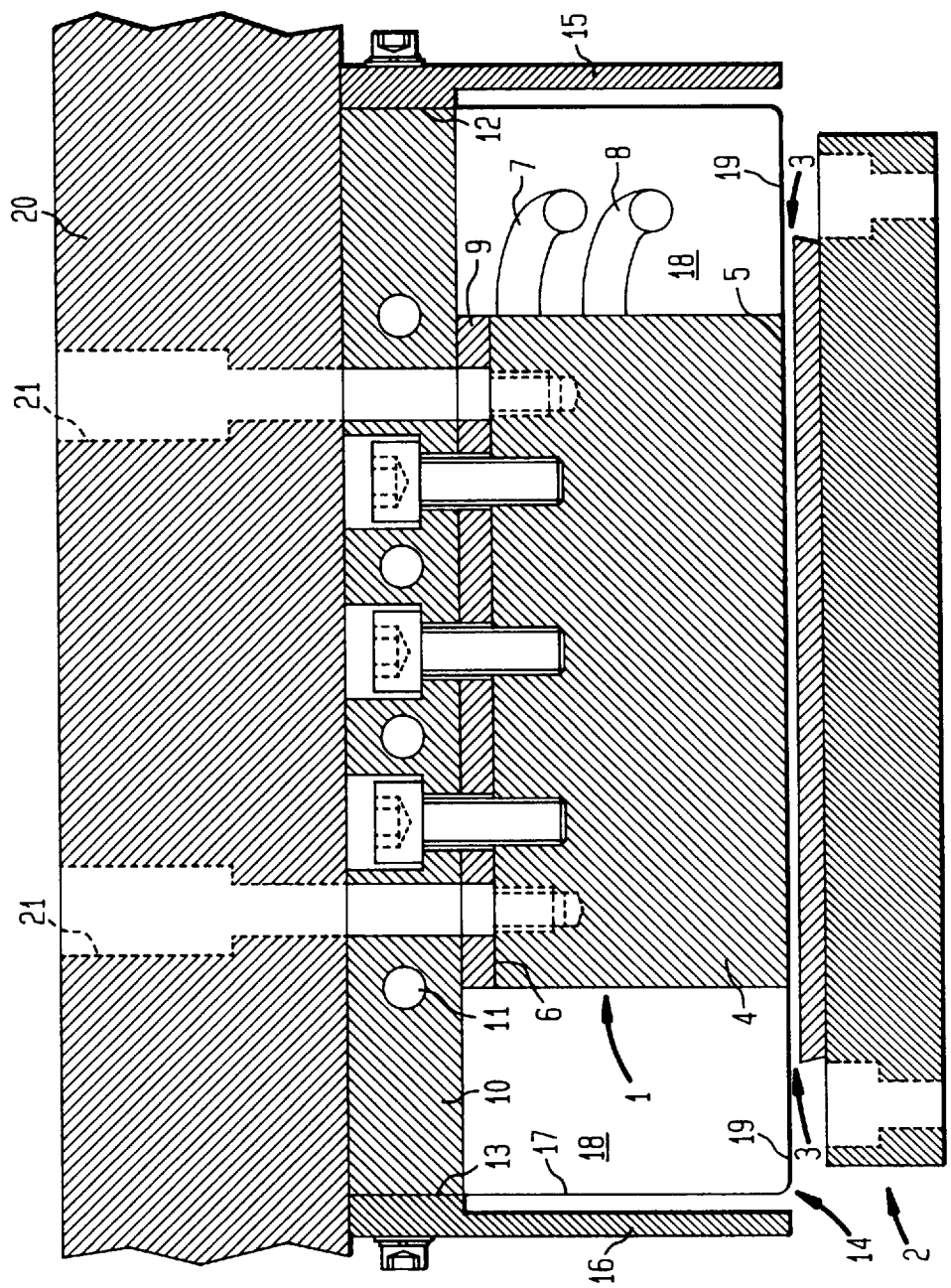
FIG. 1 shows a cross sectional view of one embodiment of a linear motor according to the present invention, secured to an exemplified machine part and showing in detail a primary part and a secondary part of the linear motor.

Throughout all the Figures, the same or corresponding elements are generally indicated by the same reference numerals.

Referring now to FIG. 1, there is shown a cross sectional view of one embodiment of a linear motor according to the present invention, including a primary part 1 and a secondary part 2 in opposite disposition at formation of an elongated air gap 3 therebetween. The primary part 1 is made of a iron body 4, preferably fabricated from laminated electric sheets, and has a flat top surface 6 and a bottom surface 5 in opposite disposition to the secondary part 2. The bottom surface 5 is formed with grooves for receiving current-carrying conductor windings (not shown).

The iron body 4 has incorporated therein a cooling circuit (not shown in detail) for circulation of a coolant. Only the supply line 7 and the return line 8 are depicted in FIG. 1.

The iron body 4 is secured to the cooling plate 10, with a thermal insulating layer 9 interposed between the iron body 4 and the cooling plate 10. The cooling plate 10 is made of solid aluminum and has formed therein passageways 11 which form part of a second cooling circuit for circulating a coolant. Heat-radiating fins 15 and 16 are secured to lateral faces 12 and 13 of the cooling plate 10, with a thin-walled encapsulating protective casing 14 interposed between the cooling plate 10 and the fins 15, 16. The protective casing 14 has side walls 17 and end walls 18, with only rear end wall 18 being shown in FIG. 1. The protective casing 14 has a bottom 19 which covers the grooved surface 5. The primary part 1 is completely enclosed and entirely sealed by the cooling plate 10 and the protective casing 14, with the supply line 7 and return line 8 sealingly routed to the outside through the protective casing 14.

The primary part 1 which is thus completely encapsulated by the cooling plate 10 and the protective casing 14, can be secured with screws (not shown) to the moveable machine part of a production machine (not shown in detail). The screws extend through bores 21 in machine part 20 and in the insulating layer 9 and can be screwed into threaded bores 22 disposed in the iron body 4.

As the iron body 4 is made of laminated electric sheets, the threaded bores 22 are only capable of carrying a limited load. Consequently, the afore-described type of attachment is thus only applicable if the primary part 1 remains permanently connected to the machine part 20.

Figure 2:
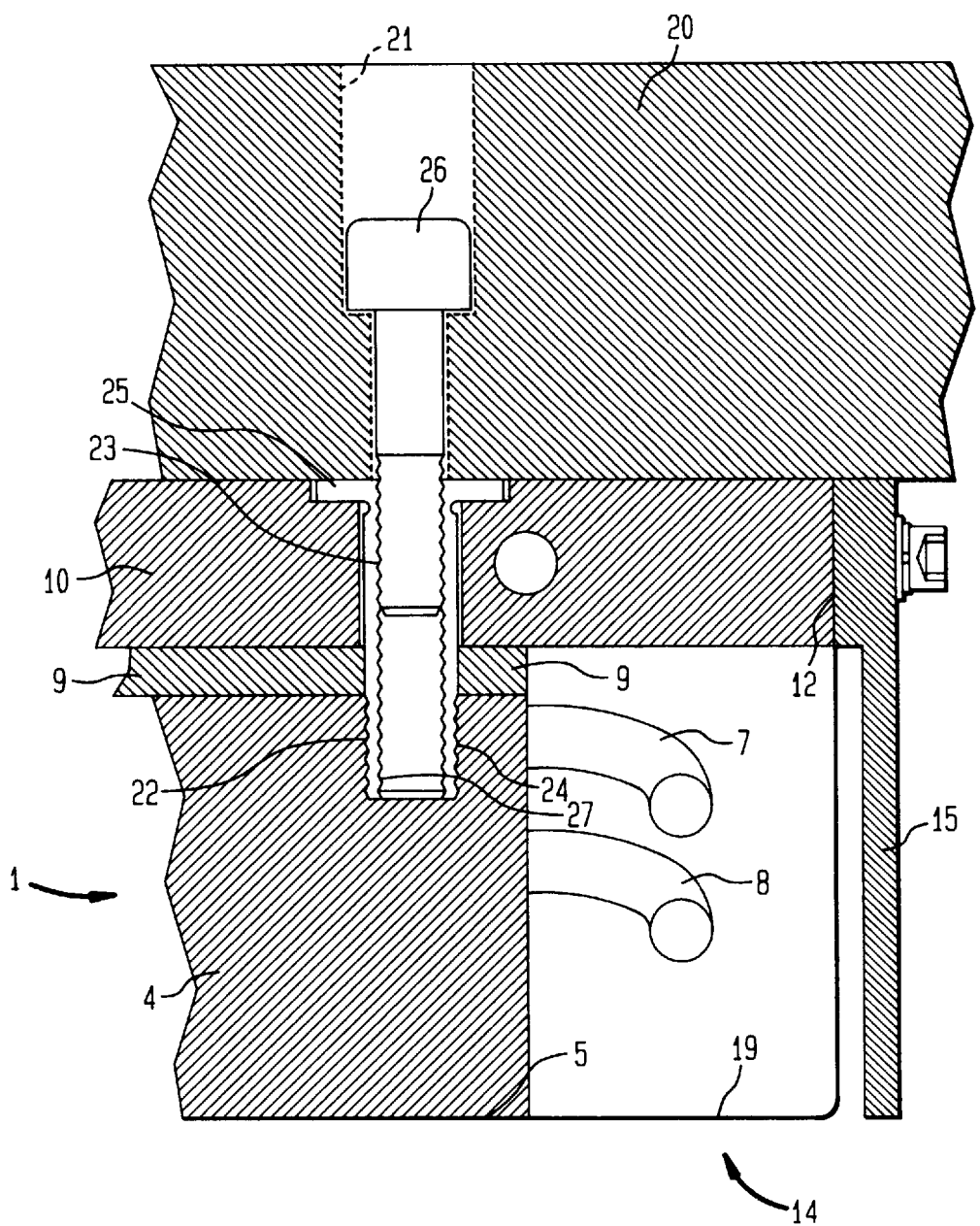
FIG. 2 is a cutaway view of the linear motor of FIG. 1, illustrating in detail a variation of an attachment of the primary part to the machine part.

If the connection should be able to withstand greater loads and allow frequent disassembly, e.g. for performing maintenance work, the type of attachment shown in FIG. 2 is more suitable. This type of attachment includes a threaded bushing 23 with an external thread 24 for connecting the cooling plate 10 and the insulating plate 9 to the iron body 4 of the primary part 1. The external thread 24 is bolted into the threaded bore 22 of the iron body 4, whereby the cooling plate 10 and the insulating plate 9 are urged against the top surface 6 of the iron body 4 by a retention collar 25 disposed on the threaded bushing 23 and supported on the cooling plate 10.

The threaded bushing 23 is permanently bolted to the primary part 1, with the securement to the machine part 20 being effected by screw fasteners 26 which are supported in the bore 21 of the machine part 20 and screwed into an internal thread 27 of the threaded bushing 23. The internal thread 27 which is made of the same solid material as the threaded bushing 23, can carry a much greater load than a thread formed in the laminated iron body 4.

While the invention has been illustrated and described as embodied in a linear motor, it is not intended to be limited to the details shown since various modifications and structural changes may be made without departing in any way from the spirit of the present invention.

What is claimed as new and desired to be protected by Letters Patent is set forth in the appended claims:

1. A linear motor, comprising:
    a primary part including a core having a first surface and a second surface facing away from the first surface;
    a secondary part, said first surface of the core opposing the secondary part and formed with grooves therein for receiving single-phase or multi-phase rotor windings;
    a cooling plate having one side secured to a machine part to be moved by the linear motor and an opposite side secured to the second surface of the core, said cooling plate having passageways for circulating a coolant; and
    a protective casing secured to the cooling plate, said primary part being completely enveloped by the cooling plate and the protective casing.

2. The linear motor of claim 1 wherein the second surface is flat.

3. The linear motor of claim 1 wherein the core is made of iron.

4. The linear motor of claim 3 wherein the core is comprised of electric sheets.

5. The linear motor of claim 1 wherein the protective casing is formed by opposite side walls and opposite end walls in vertical disposition to the cooling plate, and by a bottom covering the first surface of the core.

6. The linear motor of claim 5 wherein the side walls and the end walls of the protective casing are secured to lateral surfaces of the cooling plate.

7. The linear motor of claim 1, and further comprising a sealing member disposed between the protective casing and the cooling plate.

8. The linear motor of claim 1 wherein the protective casing is made of a thin-walled sheet of non-magnetic metal.

9. The linear motor of claim 8 wherein the non-magnetic metal is stainless steel.

10. The linear motor of claim 1 wherein the cooling plate and the protective casing form voids therebetween which are filled with a solid casting compound.

11. The linear motor of claim 1 wherein the cooling plate and the protective casing form voids therebetween which are filled with a heat transfer oil having high electric breakdown strength.

12. The linear motor of claim 11 wherein the heat transfer oil is a transformer oil.

13. The linear motor of claim 1 wherein the cooling plate is made of solid aluminum having a strength of 10 mm to 20 mm.

14. The linear motor of claim 1 wherein the primary part is formed with an integrated cooling circuit having passageways for circulating a coolant.

15. The linear motor of claim 1, and further comprising a thermally insulating layer interposed between the primary part and the cooling plate.

16. The linear motor of claim 5, and further comprising heat-radiating fins spaced in parallel disposition to walls of the protective casing and connected to the cooling plate for heat-conducting contact.

17. The linear motor of claim 1, and further comprising fastening means for securing the cooling plate to the primary part, said fastening means being provided with threaded sections for allowing attachment of the primary part to the machine part.

18. The linear motor according to claim 17 wherein the fastening means includes a threaded bushing with an external thread adapted for threading engagement with the second surface of the primary part, an internal thread in alignment with a bore disposed in the machine part, a screw fastener traversing the bore and threadably engaged with the internal thread of the bushing, and a retention collar for supporting the threaded bushing in the cooling plate.

* * * * *